(12) United States Patent
Zhu et al.

(10) Patent No.: US 11,448,738 B2
(45) Date of Patent: Sep. 20, 2022

(54) LIGHT DETECTION AND RANGING SIGNAL CORRECTION METHODS AND SYSTEMS

(71) Applicant: BEIJING VOYAGER TECHNOLOGY CO., LTD., Beijing (CN)

(72) Inventors: Zhenghan Zhu, Mountain View, CA (US); Yue Lu, Los Gatos, CA (US); John Wu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 777 days.

(21) Appl. No.: 16/283,739

(22) Filed: Feb. 23, 2019

(65) Prior Publication Data

US 2020/0271763 A1 Aug. 27, 2020

(51) Int. Cl.
*G01S 7/4863* (2020.01)
*G01S 7/489* (2006.01)
*G01S 7/497* (2006.01)
*G01S 17/931* (2020.01)

(52) U.S. Cl.
CPC ............ *G01S 7/4863* (2013.01); *G01S 7/489* (2013.01); *G01S 7/497* (2013.01); *G01S 17/931* (2020.01)

(58) Field of Classification Search
CPC ...... G01S 7/4863; G01S 17/931; G01S 7/489; G01S 7/4861; G01S 7/487; G01S 7/4873; G01S 7/4876; G01S 7/497; G01S 17/89; G01S 17/894; G01C 3/00; G01C 3/08
See application file for complete search history.

(56) References Cited

U.S. PATENT DOCUMENTS

2017/0242108 A1* 5/2017 Dussan ................. G01S 7/4863
2018/0374240 A1* 12/2018 Zhang ........................ G06T 7/90

* cited by examiner

*Primary Examiner* — Luke D Ratcliffe
(74) *Attorney, Agent, or Firm* — Bayes PLLC (57) ABSTRACT

A system and method for correcting a Light Detection And Ranging (LiDAR) return signal is disclosed. The LiDAR return signal is digitized by a converter. An exemplary signal correction system includes a signal processor configured to identify saturated samples from the LiDAR return signal, determine a correction parameter based on non-saturated samples in the LiDAR return signal and corresponding samples in a reference signal, and correct the saturated samples in the LiDAR return signal using the correction parameter.

18 Claims, 6 Drawing Sheets

LIGHT DETECTION AND RANGING SIGNAL CORRECTION METHODS AND SYSTEMS

TECHNICAL FIELD

The present disclosure relates to a Light Detection and Ranging (LiDAR) system, and more particularly to, systems and methods for correcting LiDAR return signals.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

When detected objects are close to the LiDAR system and/or when the objects have high reflectivity property, the amplitude of a returned pulse backscattered from the objects can be large. However, due to practical constraints such as the effective number of bits of an analog-to-digital converter (ADC), a LiDAR system usually has a limited dynamic range. As a result, the amplitude of a returned pulse can sometimes exceed the maximum amplitude that the LiDAR system is designed to process. Receiving signals outside the dynamic range causes signal "saturation." When saturation occurs, the return signal will be clipped and the portion that exceeds the maximum value will be set to be the maximum value of the LiDAR data record component such as an ADC.

With clipped return signals, the computed intensity of an object can be severely off from the object's true intensity. For example, the intensity of an object with reflectivity of 0.8 at 15 meters range can be mistakenly estimated by an error of −50%~−70% depending upon the dynamic range of the LiDAR system. Such error reduces the LiDAR system's performance and can lead to propagational errors in the consequential processing such as in LiDAR perception. Therefore, LiDAR can benefit from a correction method that restores the saturated and clipped signals.

Embodiments of the disclosure address the above problems by improved systems and methods for correcting the saturated LiDAR return signal.

SUMMARY

In one aspect, a system for correcting a Light Detection And Ranging (LiDAR) return signal is disclosed. The LiDAR return signal is digitized by a converter. An exemplary system includes a signal processor configured to identify saturated samples from the LiDAR return signal, determine a correction parameter based on non-saturated samples in the LiDAR return signal and corresponding samples in a reference signal, and correct the saturated samples in the LiDAR return signal using the correction parameter.

In another aspect, a method for correcting a Light Detection And Ranging (LiDAR) return signal is disclosed. The LiDAR return signal is digitized by a converter. The exemplary method includes identifying saturated samples from the LiDAR return signal, determining a correction parameter based on non-saturated samples in the LiDAR return signal and corresponding samples in a reference signal, and correcting the saturated samples in the digital signal using the correction parameter.

In yet another aspect, a LiDAR system is disclosed. The exemplary LiDAR system includes a photodetector configured to detect a LiDAR return signal. The LiDAR system further includes a converter configured to digitize the LiDAR return signal. The signal correction system also includes a signal processor. The signal processor is configured to identify saturated samples from the LiDAR return signal, determine a correction parameter based on non-saturated samples in the LiDAR return signal and corresponding samples in a reference signal, and correct the saturated samples in the LiDAR return signal using the correction parameter.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
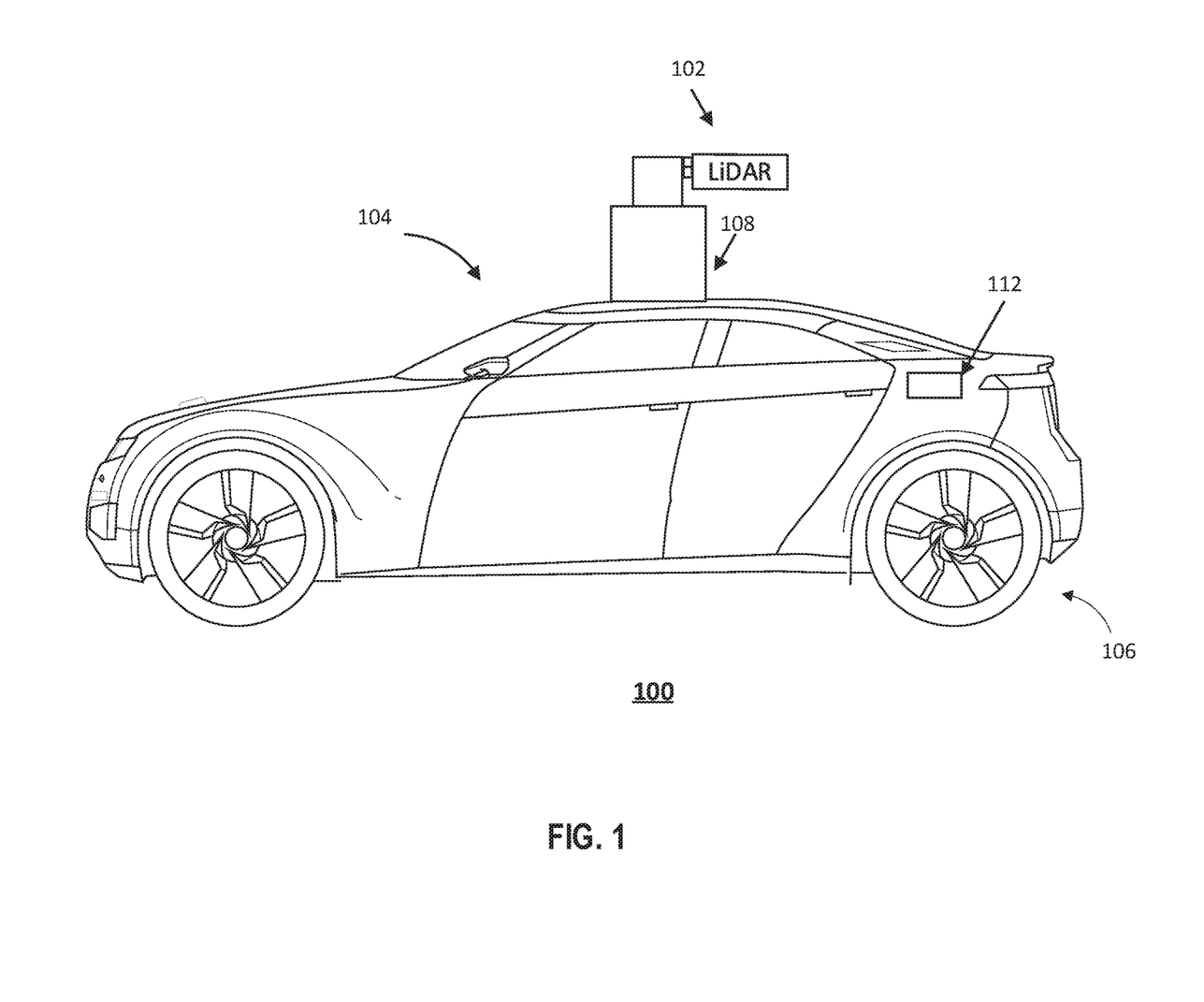
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. Consistent with some embodiments, vehicle 100 may be an autonomous vehicle or semi-autonomous vehicle that uses the LiDAR to detect and position obstacles and objects around it to make driving decisions.

It is contemplated that vehicle 100 may be an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. It is contemplated that the manners in which LiDAR system 102 can be equipped on vehicle 100 are not limited by the example shown in FIG. 1 and may be modified depending on the types of LiDAR system 102 and/or vehicle 100 to achieve desirable 3-D sensing performance.

Consistent with some embodiments, LiDAR system 102 may be configured to capture data as vehicle 100 moves along a trajectory. LiDAR system 102 measures distance to a target by illuminating the target with pulsed laser light and measuring the reflected pulses with a receiver. The laser light used for LiDAR system 102 may be ultraviolet, visible, or near infrared. For example, a transmitter of LiDAR system 102 is configured to scan a surrounding object, and a receiver of LiDAR system 102 is configured to receive light backscattered from the surrounding object. The received signals may be processed to construct point clouds reflecting the position, shape, and size of the object. As vehicle 100 moves along the trajectory, LiDAR system 102 may continuously capture and process data.

The amplitude of the pulsed signal received is determined the reflectivity of the object. Reflectivity (usually measured by reflectance) is the fraction of incident electromagnetic power that is reflected at the surface of the object. Reflectivity takes values in the [0, 1] range. The object's reflectivity increases as the distance between the object and LiDAR system 102 shortens. For example, the object's reflectivity may be 0.8 at a distance of 15 meters, where 80% of the incident power is reflected by its surface. Therefore, the received LiDAR signal is more likely to saturate when the object is closer to LiDAR system 102. For example, partial signal saturation (i.e., at least one but not all signal samples in a pulse saturate) may occur when the object is about 5 meters to 30 meters away, where the disclosed signal correction systems and methods may be most helpful.

Consistent with the present disclosure, vehicle 100 may include a local controller 112 inside body 104 of vehicle 100 or communicate with a remote computing device, such as a server, (not illustrated in FIG. 1) for controlling the operations of LiDAR system 102. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
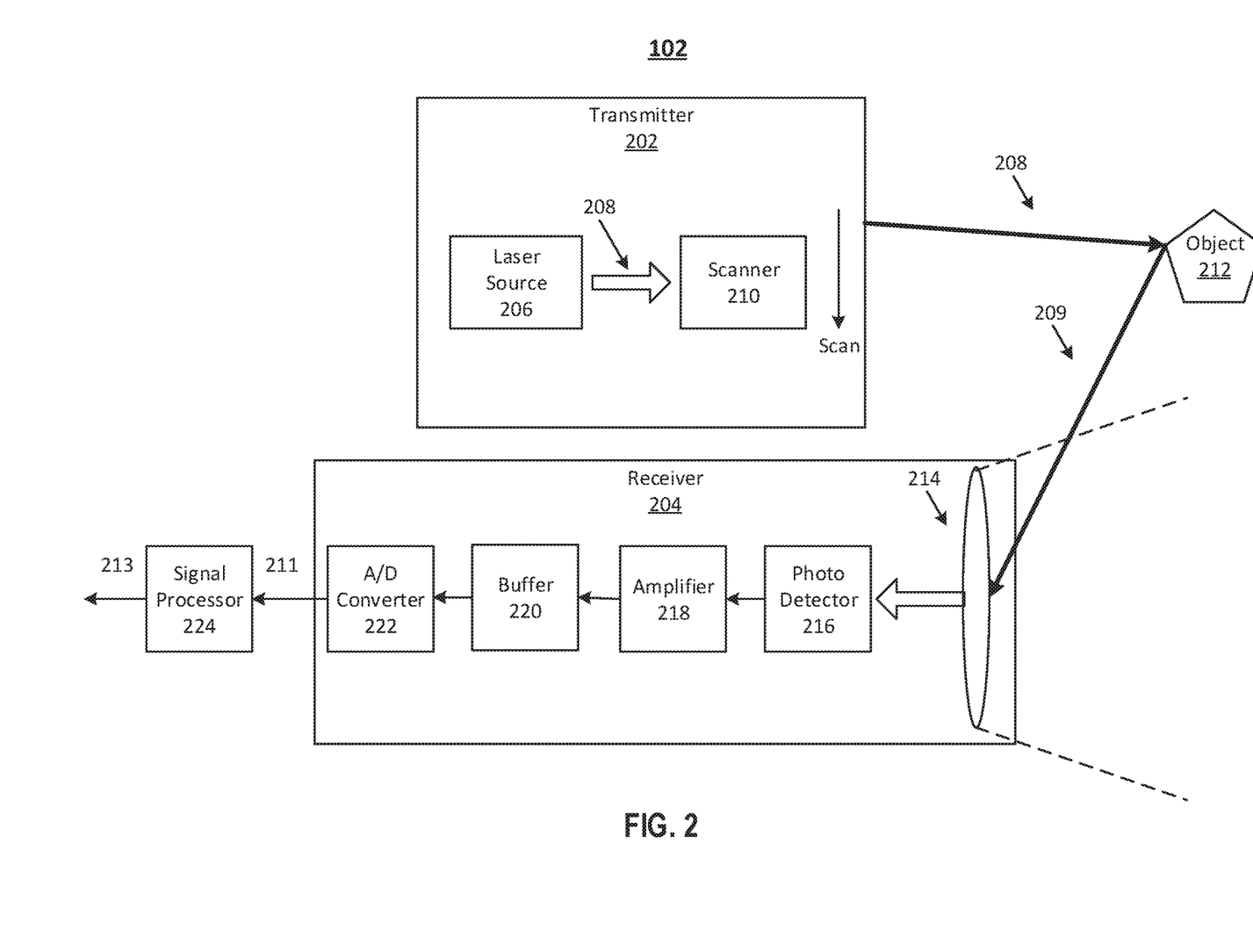
FIG. 2 illustrates a block diagram of an exemplary LiDAR system having a signal correction system, according to embodiments of the disclosure.

FIG. 2 illustrates a block diagram of an exemplary LiDAR system 102 having a signal correction system, according to embodiments of the disclosure. LiDAR system 102 may include a transmitter 202 and a receiver 204. Transmitter 202 may emit laser beams within a scan angle. Transmitter 202 may include a laser source 206 and a scanner 210. In some embodiments, laser source 206 may generate a pulsed laser beam 208 (also referred to as a native or incident laser beam 208) in the ultraviolet, visible, or near infrared wavelength range.

In some embodiments, laser sources 206 may be a Pulsed Laser Diode (PLD). A PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of native laser beam 208 provided by a PLD may be smaller than 1,100 nm, such as 405 nm, between 445 nm and 465 nm between 510 nm and 525 nm, 532 nm, 635 nm, between 650 nm and 660 nm, 670 nm, 760 nm, 785 nm, 808 nm, or 848 nm. Native laser beam 208 includes a plurality of pulses. In some embodiments, the pulses in native laser beam 208 typically has a narrow width in order to map physical features with very high resolution.

In some embodiments, scanner 210 may be configured to emit laser beam 208 to an object 212 in one or more directions to scan object 212. Object 212 may be made of a wide range of materials including, for example, non-metallic objects, rocks, rain, chemical compounds, aerosols, clouds and even single molecules. At each time point during the scan, scanner 210 may emit native laser beam 208 to object 212 in a direction within the scan angle. In some embodiments of the present disclosure, scanner 210 may also include optical components (e.g., lenses, mirrors) that can focus pulsed laser light into a narrow laser beam to increase the scan resolution and range of object 212. Depending on the material composition, shape, and distance of object 212, the laser beam is reflected by object 212 at a corresponding reflectivity (e.g., 0.5, 0.6, 0.7, 0.8, and 0.9, etc.), and returned to LiDAR system 102.

As part of LiDAR system 102, receiver 204 may be configured to detect a returned laser beam 209 returned from object 212 in a different direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. Returned laser beam 209 also includes a plurality of pulses.

As illustrated in FIG. 2, receiver 204 may include a lens 214, a photodetector 216, an amplifier 218, an ADC 222, and a signal processor 224. In some embodiments, lens 214 may be configured to collect light from a respective direction in its field of view (FOV). At each time point during the scan, returned laser beam 209 may be collected by lens 214.

Photodetector 216 may be configured to detect returned laser beam 209 returned from object 212. Photodetector 216 may convert the laser light (e.g., returned laser beam 209) collected by lens 214 into an electrical signal (e.g., a current or a voltage signal). Consistent with the disclosure, the electrical signal output by photodetector 216 may be referred to as a LiDAR return signal. The current is generated when photons are absorbed in the photodiode. In some embodiments, photodetector 216 may include silicon PIN photodiodes that utilize the photovoltaic effect to convert optical power into an electric current. For example, photodetector 216 may include an array of avalanche photodiodes (APDs).

An APD is a highly sensitive semiconductor electronic device that exploits the photoelectric effect to convert light to electricity. In some embodiments, APDs provide a built-in first stage of gain through avalanche multiplication. In some embodiments, by applying a high reverse bias voltage (typically 100-200 V in silicon), APDs may show an internal current gain effect (around 100) due to impact ionization (also known as an avalanche effect). In some other embodiments, APDs may employ alternative doping and beveling techniques, and allow greater voltage to be applied (>1500 V) before breakdown is reached, which results in a greater operating gain (>1000). APDs are therefore ideal for laser-based distance measurement, laser scanning and mapping, shape recognition and remote sensing, as well as LiDAR.

Amplifier 218 may be configured to amplify LiDAR return signal 211 detected by photodetector 216. Amplification may increase the amplitude of the pulses in LiDAR return signal 211. In LiDAR applications, a low-noise amplifier is used to optimize the range of the system because the amplitude of the return signals decreases proportionally to the square of the distance. In some embodiments, amplifier 218 may be a very-low-noise transimpedance amplifier (TIA). A TIA is a current-to-voltage converter and may be used with sensors that have a current response that is more linear than the voltage response, such as photodiodes. For example, amplifier 218 may include a TIA to amplify the current output of photodetector 216 to a usable voltage. The frequency response of a TIA is inversely proportional to the gain, which is set by the feedback resistor. The sensor that the TIA is used with (such as a photodetector) can be modeled as a current source and a capacitor C. This capacitance across the input terminals of the op-amp in the TIA introduces a low-pass filter in the feedback path. Therefore, the photo detection and amplification, e.g., performed by an ADP and a TIA, may act as a low-pass filter and distort the pulses in returned laser beam 209.

In some embodiments, buffer 220 may be included to further scale LiDAR return signal 211. For example, buffer 220 may be designed to amplify LiDAR return signal 211 at another gain. The electrical signal generated by photodetector 216 and scaled by amplifier 218 and buffer 220 remain in the analog form. To facilitate subsequent signal processor in digital form, receiver 204 may include ADC 222 to digitize LiDAR return signal 211 into a digital signal. In some embodiments, ADC 222 may be replaced by a time-to-digital converter (TDC). TDC is a device for recognizing events and providing a digital representation of the time they occurred. For example, a TDC may output the time of arrival for each incoming pulse.

ADC 222 may distort the pulsed signals during digitalization, as the amplitude of LiDAR return signal 211 may exceed the dynamic range of ADC 222. For example, ADC 222 may be limited to an input voltage of a threshold value (known as the maximum input voltage). In some embodiments, the maximum input voltage of ADC 222 may be 1.8 V. The maximum input voltage is determined by the hardware parameters and configuration of ADC 222 and may be set at an appropriate level for the device.

Figure 3A:
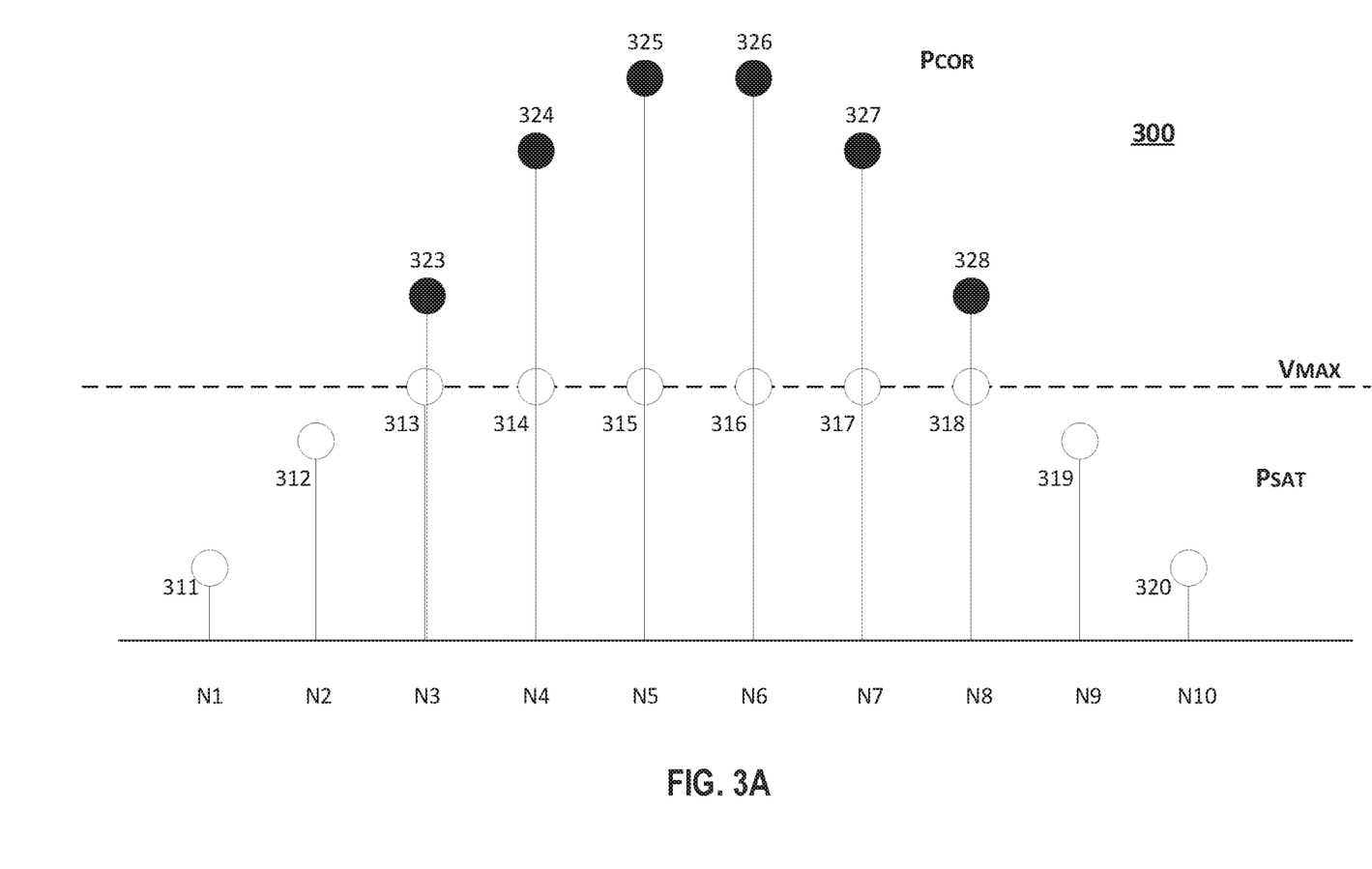
FIG. 3A illustrates an exemplary pulse with saturated samples, according to embodiments of the disclosure.

As the pulse amplitude of LiDAR return signal 211 (i.e., peak signal value of the pulse) increases, the pulse signal may saturate and be clipped at the maximum input voltage. As a result, digitized LiDAR return signal 211 may contain samples that are clipped at the maximum input voltage (referred to herein as "saturated samples"). For example, FIG. 3A illustrates an exemplary pulse 300 with saturated samples, according to embodiments of the disclosure. A pulse may contain Np signal samples indexed from 1 to Np, respectively. For example, FIG. 3A shows that pulse 300 contains 10 samples 311-320 (denoted by the hollow circles). Saturated samples 313-318 have intensities clipped by the maximum input voltage (Vmax) of ADC 222. Without the dynamic range limitation, saturated samples 313-318 would have different intensities higher than Vmax.

If a saturated LiDAR return signal is used to compute the intensity of object 212, the intensity estimation can be severely off from the object's true intensity, causing detection and/or positioning errors to LiDAR system 102. Referring back to FIG. 2, in some embodiments consistent with the present disclosure, receiver 204 may include a signal processor 224 to correct or mitigate the signal distortion caused by saturation and signal clipping. In some embodiments, signal processor 224 may restore the saturated samples in LiDAR return signal 211 by estimating the true values of those samples before clipped by ADC 222.

Figure 4:
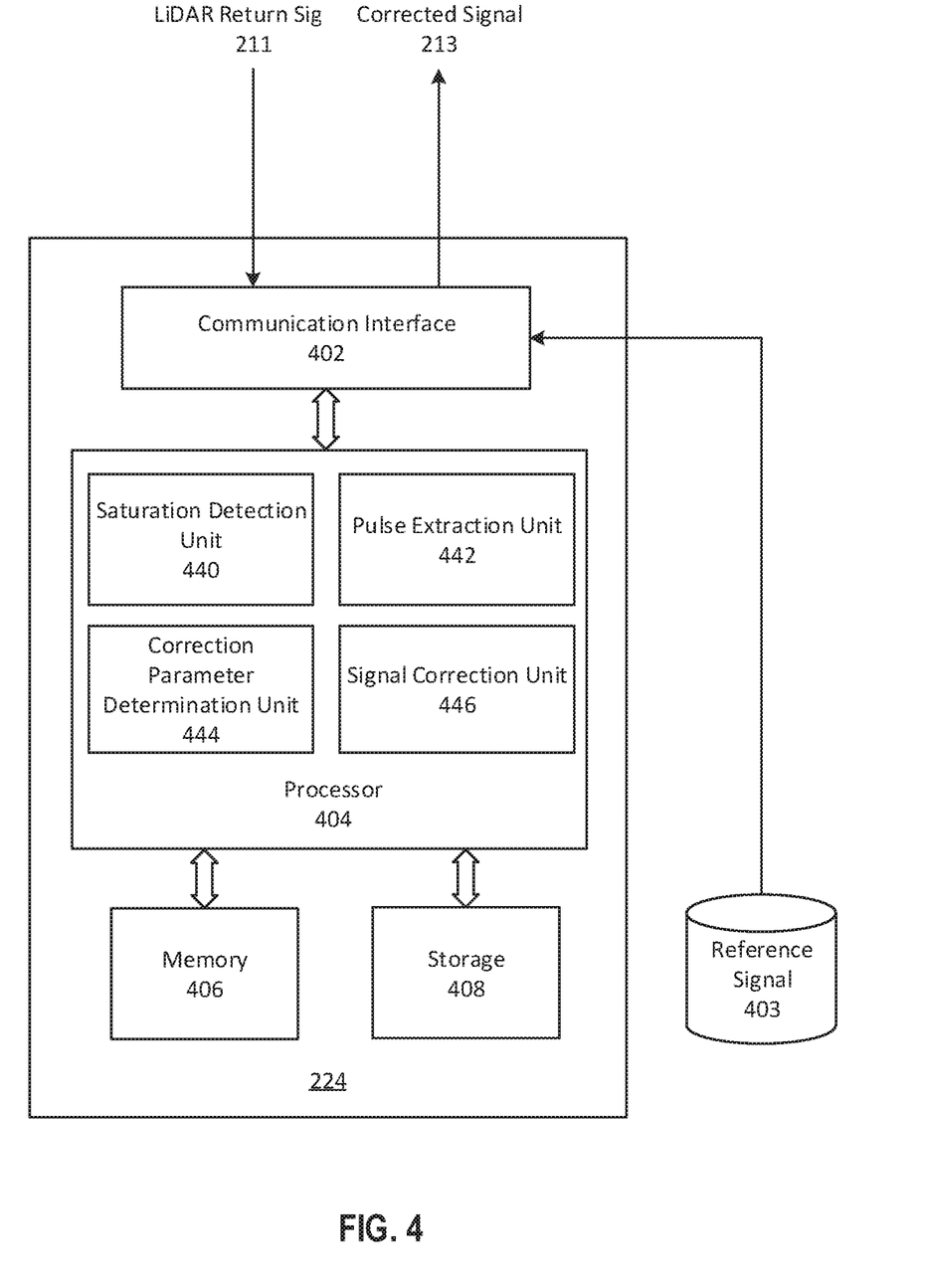
FIG. 4 is a block diagram of an exemplary digital processor for correcting a saturated LiDAR return signal, according to embodiments of the disclosure.

FIG. 4 is a block diagram of an exemplary signal processor 224 for correcting a saturated LiDAR return signal (e.g., LiDAR return signal 211), according to embodiments of the disclosure. As shown in FIG. 4, signal processor 224 may include a communication interface 402, a processor 404, a memory 406, and a storage 408. In some embodiments, signal processor 224 may have different modules in a single device, such as an integrated circuit (IC) chip (implemented as an application-specific integrated circuit (ASIC) or a field-programmable gate array (FPGA)), or separate devices with dedicated functions. Components of signal processor 224 may be in an integrated device or distributed at different locations but communicate with each other through a network (not shown).

Communication interface 402 may send data to and receive data from components such as ADC 222 via direct communication links, a Wireless Local Area Network (WLAN), a Wide Area Network (WAN), wireless communication networks using radio waves, a cellular network, and/or a local wireless network (e.g., Bluetooth™ or WiFi), or other communication methods. In some embodiments, communication interface 402 can be an integrated services digital network (ISDN) card, cable modem, satellite modem, or a modem to provide a data communication connection. As another example, communication interface 402 can be a local area network (LAN) card to provide a data communication connection to a compatible LAN. Wireless links can also be implemented by communication interface 402. In such an implementation, communication interface 402 can send and receive electrical, electromagnetic or optical signals that carry digital data streams representing various types of information via a network.

Consistent with some embodiments, communication interface 402 may receive LiDAR return signal 211 digitized by ADC 222 and provide the received information to memory 406 and/or storage 408 for storage or to processor 404 for processing. Communication interface 402 may also receive a reference signal 403. In some embodiments, reference signal 403 may be a predefined transmit pulse signal. The LiDAR return signal, when not saturated, will have been in the shape of the reference signal. In some embodiments, reference signal 403 may be a benchmark return signal received by LiDAR system 102 under circumstances where saturation is known to have not occurred. Reference signal 403 may be stored in a database of a storage device external to signal processor, or as part of signal processor 224, such as memory 406 or storage 408.

Figure 3B:
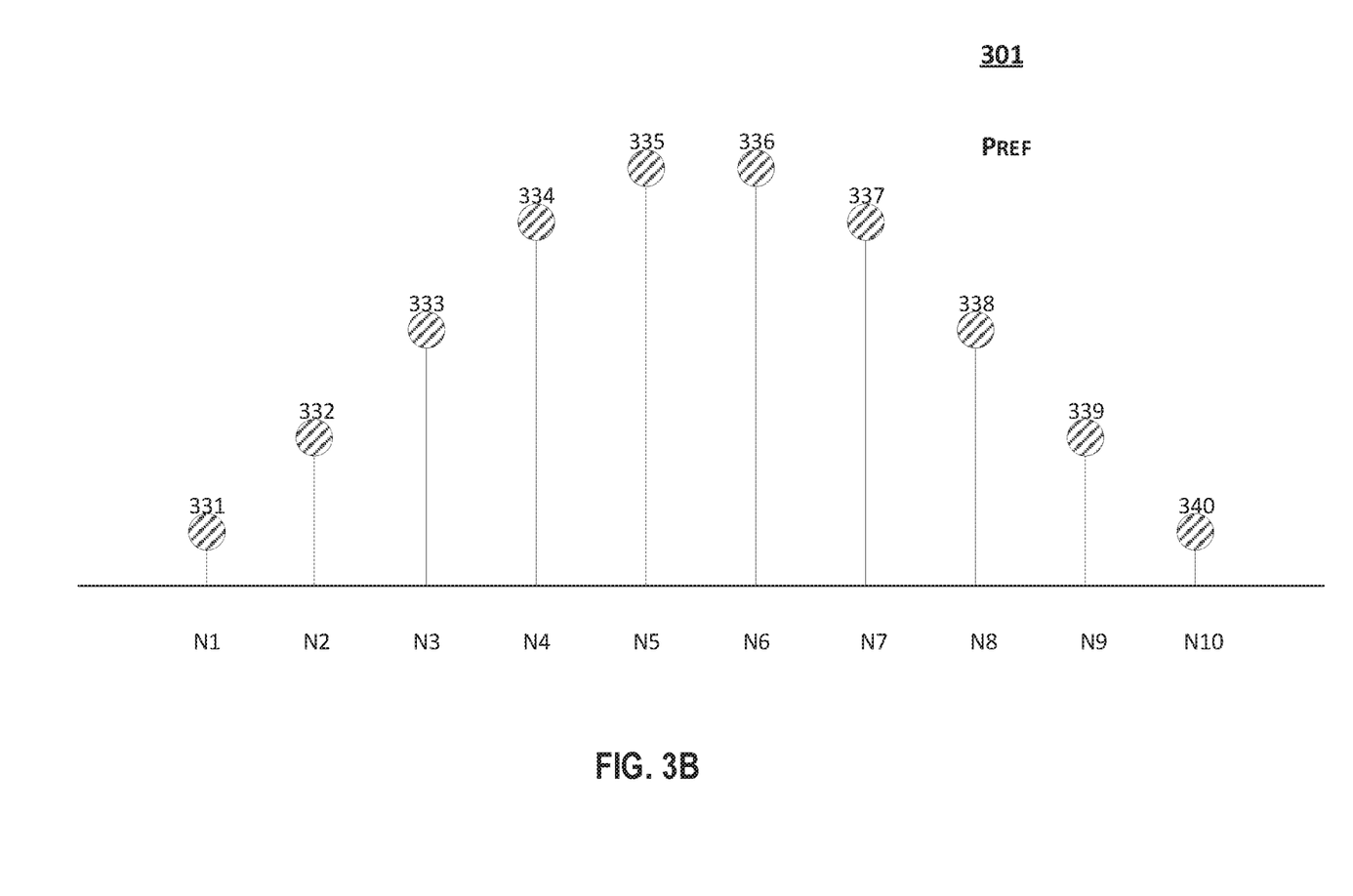
FIG. 3B illustrates an exemplary reference pulse, according to embodiments of the disclosure.

For example, FIG. 3B illustrates an exemplary reference pulse 301, according to embodiments of the disclosure. The reference pulse is a digital pulse that includes an identical number of samples as a pulse in the LiDAR return signal to be corrected. For example, reference pulse 301 shown in FIG. 3B includes 10 samples 331-340, the same number of samples as in pulse 300 of LiDAR return signal 211. Unlike pulse 300, reference pulse 301 has the complete transmit pulse shape, without any clipping at the top.

Processor 404 may include any appropriate type of general-purpose or special-purpose microprocessor, digital signal processor (DSP), or microcontroller. Processor 404 may be configured as a separate processor module dedicated to signal correction to provide corrected signal 213. Alternatively, processor 404 may be configured as a shared processor module for performing other functions related to or unrelated to LiDAR signal correction. For example, the shared processor may further process corrected signal 213 to estimate the intensity of the detected object.

As shown in FIG. 4, processor 404 may include multiple modules, such as a saturation detection unit 440, a pulse extraction unit 442, a correction parameter determination unit 444, a signal correction unit 446, and the like. These modules (and any corresponding sub-modules or sub-units) can be hardware units (e.g., portions of an integrated circuit) of processor 404 designed for use with other components or to execute part of a program. The program may be stored on a computer-readable medium (e.g., memory 406 and/or storage 408), and when executed by processor 404, it may perform one or more functions. Although FIG. 4 shows units 440-446 all within one processor 404, it is contemplated that these units may be distributed among multiple processors located near or remotely with each other.

Saturation detection unit 440 is configured to detect whether a saturation has occurred in LiDAR return signal 211. In some embodiments, saturation detection unit 440 compares the intensity of the LiDAR return signal, i.e., the digital value of the return signal samples S[n], to a predetermined intensity threshold, sample by sample. For example, the predetermined intensity threshold may be the maximum input voltage, Vmax, of ADC 222. If any sample is equal to the Vmax, then a saturation is identified occurred. For example, saturation detection unit 440 may compare values S[1]-S[10] of samples 311-320 in pulse 300 (shown in FIG. 3A) to a Vmax (e.g., 1.8V). Because sample values S[3]-S[8] are all clipped at Vmax, saturation detection unit 440 may detect that a saturation has occurred to pulse 300.

Pulse extraction unit 442 identifies a saturated pulse vector and extracts a pulse from LiDAR return signal 211 that contains the saturated pulse vector. In some embodiments, a saturated pulse vector may be identified by searching all samples that are saturated in a pulse processing time. Pulse extraction unit 442 may record the indexes of the saturated samples, which are denoted as [Isb, Ise], where Isb is the index of the first saturated sample and Ise is the index of the last saturated sample. Depending on the object's range, reflectivity and ADC number of bits and so on, the number of saturated samples, Nps, can vary from 0 to the length of the transmit signal pulse, Np. For example, pulse extraction unit 442 may identify a saturated pulse vector including samples 313-318 (i.e., index range of [3, 8]) from pulse 300 (shown in FIG. 3A). In this example, Nps=6, i.e., 6 out of 10 samples in pulse 300 are saturated samples.

In some embodiments, based on the identified saturated pulse vector and Nps, pulse extraction unit 442 may extract the whole pulse Psat that contains the saturated pulse vector from LiDAR return signal 211 according to Equation (1).

$$Psat=S[Isb+\text{floor}(Nps/2)-\text{floor}(Np/2):Isb+\text{floor}(Nps/2)-\text{floor}(Np/2)+Np-1]. \quad (1)$$

where Np is the total number of samples in the extracted pulse, Nps the number of saturated samples in the pulse, and Isb is the index of the first saturated sample. For example, pulse 300 shown in FIG. 3A, containing samples 311-320, may be extracted from LiDAR return signal 211. This captures the portion of the return saturated pulse from the received LiDAR signal.

Correction parameter determination unit 444 calculates a true signal pulse gain G, as a correction parameter to be used for correcting LiDAR return signal 211. In some embodiments, the gain G is determined based on a comparison of the extracted pulse and a reference pulse in reference signal 403. In some embodiments, the reference pulse may be a predefined transmit pulse, which also has Np samples.

In one embodiment, the gain G is computed as a ratio between an aggregated intensity (e.g., the total values) of non-saturated samples in the received pulse of the LiDAR return signal (As), and an aggregated intensity (e.g., the total values) of the corresponding samples of the reference pulse (Ar). As and Ar are computed according to Equations (2) and (3).

$$As=\text{sum}(Psat[Isb+\text{floor}(Nps/2)-\text{floor}(Np/2):Isb-1])+\text{sum}(Psat[Ise+1:Np]) \quad (2)$$

$$Ar=\text{sum}(Pref[Isb+\text{floor}(Nps/2)-\text{floor}(Np/2):Isb-1])+\text{sum}(Pref[Ise+1:Np] \quad (3)$$

where Psat is the signal intensity of a sample in the extracted pulse, and Pref is the signal intensity of a sample in the reference pulse. Using the exemplary pulse 300 and exemplary reference pulse 301 shown in FIG. 3A and FIG. 3B for explanation purpose, the non-saturated samples of pulse 300 are samples 311, 312, 319, and 320. Applying Equation (2), As=sum (Psat[1:2])+sum(Psat[9:10]). Applying Equation (3), Ar=sum (Pref[1:2])+sum(Pref[9:10]). Accordingly, correction parameter determination unit 444 may calculate gain G as G=As/Ar.

In an alternatively embodiment, the gain G is computed as an average of gains/ratios between the individual non-saturated samples in the received pulse of the LiDAR return signal, and the corresponding samples of the reference pulse. That is, G can be calculated according to Equation (4).

$$G=(\text{sum}(Psat[Isb+\text{floor}(Nps/2)-\text{floor}(Np/2):Isb-1]/Pref[Isb+\text{floor}(Nps/2)-\text{floor}(Np/2):Isb-1])+\text{sum}(Psat[Ise+1:Np]/Pref[Ise+1:Np]))/(Np-Nps) \quad (4)$$

Using the exemplary pulse 300 and exemplary reference pulse 301 shown in FIG. 3A and FIG. 3B for explanation purpose, the non-saturated samples of pulse 300 are samples 311, 312, 319, and 320. Applying Equation (4), G=(Psat[1]/Pref[1]+Psat[2]/Pref[2]+Psat[3]/Pref[3]+Psat[4]/Pref[4])/4.

By using all the non-saturated samples to calculate the gain G, the correction parameter may be accurate because of improved signal-to-noise ratio (SNR). However, it is contemplated that correction parameter determination unit 444 may use a subset of non-saturated samples to calculate the G. In additional, it is contemplated that the gain G may be a function of the non-saturated samples in the extracted pulse, and the corresponding samples in the reference pulse, without limiting to the embodiments described above. For example, G may be a weighted average of the individual gains. As another example, instead of a straight sum, As and Ar may be calculated as a root of the sum of squares of the sample intensities.

Signal correction unit 446 then applies the correction parameter to correct LiDAR return signal 211. In some embodiments, the correction parameter, e.g., gain G, may be multiplied to the intensities of the samples in the reference signal corresponding to the saturated samples in the reference signal. Signal correction unit 446 effectively restores the saturated samples by replacing their values with the values of the corresponding samples in the reference signal as scaled by the correction parameter, according to Equation (5).

$$Pcor[Isb:Ise]=G*Pref[Isb:Ise] \quad (5)$$

where Pcor is the restored intensity of a saturated sample. For example, saturated samples 313-318 can be corrected to restored samples 323-328 with values G*Pref[3:8], as shown in FIG. 3A.

Memory 406 and storage 408 may include any appropriate type of mass storage provided to store any type of information that processor 404 may need to operate. Memory 406 and storage 408 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 406 and/or storage 408 may be configured to store one or more computer programs that may be executed by processor 404 to perform pedestrian trajectory functions disclosed herein. For example, memory 406 and/or storage 408 may be configured to store program(s) that may be executed by processor 404 to correct LiDAR return signal 211 using a correction parameter.

Memory 406 and/or storage 408 may be further configured to store information and data used by processor 404. For instance, memory 406 and/or storage 408 may be configured to store LiDAR return signal 211, the threshold intensity value, and reference signal 403 received from a database. Memory 406 and/or storage 408 may also be configured to store intermediate data generated by processor 404 during signal correction, such as the saturated samples, the extracted pulse, and the calculated gain. The various types of data may be stored permanently, removed periodically, or disregarded immediately after each frame of data is processed.

Figure 5:
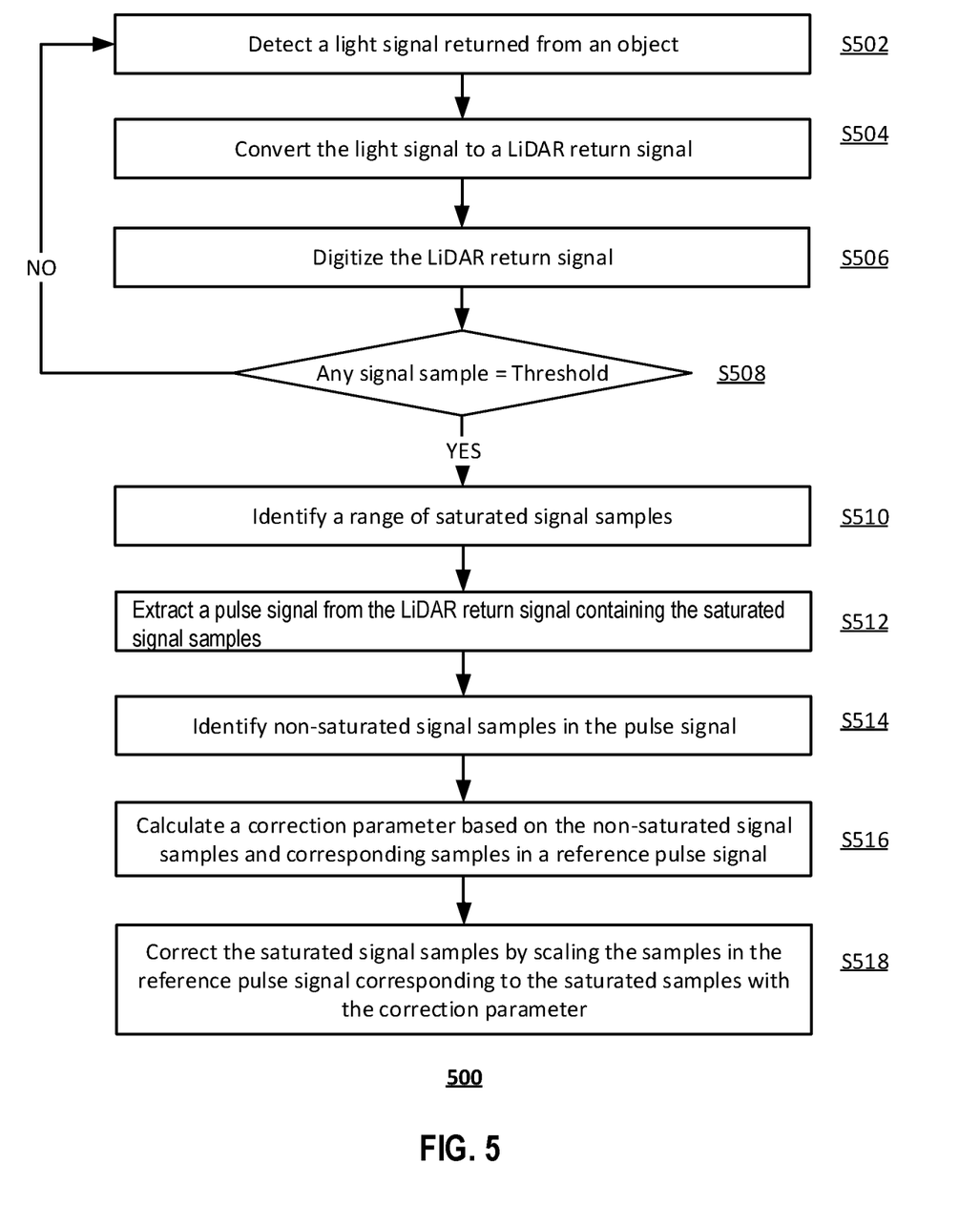
FIG. 5 illustrates a flow chart of an exemplary method for correcting a saturated LiDAR return signal, according to embodiments of the disclosure.

FIG. 5 illustrates a flow chart of an exemplary method for correcting a saturated LiDAR return signal, according to embodiments of the disclosure. For example, method 500 may be implemented by LiDAR system 102 that includes, among other things, receiver 204 and signal processor 224. However, method 500 is not limited to that exemplary embodiment. Method 500 may include steps S502-S518 as described below. It is to be appreciated that some of the steps may be optional to perform the disclosure provided herein. Further, some of the steps may be performed simultaneously, or in a different order than shown in FIG. 5.

In step S502, photodetector 216 of receiver 204 may detect a light signal returned by an object. In some embodiments, the light signal may be collected by lens 214. In step 504, components of receiver 204 may convert the light signal collected by lens 214 into an electrical signal (referred to as a LiDAR return signal). For example, photodetector 216 may include silicon PIN photodiodes, such as an array of APDs, to convert optical power into an electric current. In some embodiments, an amplifier, such as a TIA, may further convert the current to a voltage.

In step S506, ADC 222 may digitize the LiDAR return signal. ADC 222 may have a limited dynamic range. For example, ADC 222 may have a limited to a maximum input voltage, e.g., 1.8V. Intensity of the LiDAR return signal may depend on the reflectivity of the object, which is determined by the materials and surface shape of the object and its distance to the LiDAR. For example, an object at 15 meters away from the LiDAR may have a relatively high reflectivity 0.8, while the same object at 50 meters away may have significantly lower reflectivity. Depending on the reflectivity, some LiDAR return signals may have amplitudes below Vmax, and therefore, no saturation may occur. On the other hand, when the pulse amplitude of the LiDAR return signal exceeds the maximum input voltage Vmax, the LiDAR return signal saturates, and the portion exceeding Vmax will be clipped at Vmax. The digitized LiDAR return signal 211 may therefore contain saturated samples that are clipped at the maximum input voltage. For example, FIG. 3A illustrates an exemplary pulse 300 with saturated samples 313-318 clipped at Vmax as their actual values exceed Vmax.

In step S508, saturation detection unit 440 detects whether saturation occurs in the LiDAR return signal, by comparing the intensity of each sample in the LiDAR return signal to a predetermined intensity threshold. For example, the predetermined intensity threshold may be the maximum input voltage, Vmax, of ADC 222. If any sample is equal to the Vmax, then a saturation is identified occurred (S508:Yes) and method 500 proceeds to step S510. For example, if any of sample values S[1]-S[10] in pulse 300 (shown in FIG. 3A) equals to Vmax, saturation detection unit 440 detects the saturation. Otherwise, if no sample equals to Vmax (S508:No), saturation detection unit 440 determines that no saturation has occurred and method 500 returns to step S502 to receive additional signals. When no saturation is detected, no correction is necessary.

In step S510, pulse extraction unit 442 a range of saturated signal samples. In some embodiments, a saturated pulse vector is identified, e.g., by searching all samples that are saturated in a pulse processing time. Pulse extraction unit 442 may record the indexes of the saturated samples, which are denoted as [Isb, Ise], where Isb is the index of the first saturated sample and Ise is the index of the last saturated sample. Isb can be as small as 1 and Ise can be as large as Np, the length of the transmit signal pulse.

The length of saturated pulse vector (i.e., the total number of saturated samples in a pulse processing time), Nps, can vary between 0 and Np. When Nps=0, no saturation sample is identified, and when Nps=Np, all samples saturate. The disclosed systems and methods are most beneficial when Nps=1 to Np−2, i.e., at least two samples during a pulse processing time are non-saturated. For example, pulse extraction unit 442 may identify a saturated pulse vector including samples 313-318 (i.e., index range of [3, 8]) from pulse 300. In this example, Nps=6, i.e., 6 out of 10 samples in pulse 300 are saturated samples.

In step S512, pulse extraction unit 442 may extract the whole pulse Psat that contains the saturated samples. In some embodiments, the pulse Psat may be extracted based on the identified saturated pulse vector and Nps, e.g., according to Equation (1). Based on Equation (1), samples with indices between Isb+floor(Nps/2)−floor(Np/2) and Isb+floor(Nps/2)−floor(Np/2)+Np−1 may be extracted as part of the pulse. For example, pulse 300 shown in FIG. 3A, containing samples 311-320, may be extracted from the LiDAR return signal.

In step S514, correction parameter determination unit 444 may identify the non-saturated samples in the extracted pulse signal. For example, samples with indices between Isb+floor(Nps/2)−floor(Np/2) and Isb−1, as well as between Ise+1 and Np may be identified as non-saturated samples.

For example, samples 311, 312, 318, and 319 of pulse 300 in FIG. 3A are non-saturated samples.

In step S514, correction parameter determination unit 444 may calculate a correction parameter based on the non-saturated signal samples identified in step S512 and corresponding samples in a reference pulse signal. The reference pulse signal may be a predefined transmit pulse signal, in the same shape as the LiDAR return signal, before being clipped by Vmax. In some embodiments, the reference pulse signal may be a benchmark return pulse received by LiDAR system 102 under circumstances where saturation is known to have not occurred. The reference pulse signal also has Np samples. For example, an exemplary reference pulse 301 is shown in FIG. 3B.

In step S516, correction parameter determination unit 444 may calculate the correction parameter based on the non-saturated samples in the LiDAR return signal and the corresponding samples in the reference pulse signal, according to various formulas. As an exemplary embodiment, the correction parameter is computed as a ratio between the total values of non-saturated samples in the received pulse of the LiDAR return signal (As), and the total values of the corresponding samples of the reference pulse (Ar), where As and Ar are computed according to Equations (2) and (3). In an alternatively embodiment, the correction parameter is computed as an average of gains/ratios between the individual non-saturated samples in the received pulse of the LiDAR return signal, and the corresponding samples of the reference pulse, e.g., according to Equation (4).

In step S518, signal correction unit 446 may correct the saturated signal samples by scaling the samples in the reference pulse signal corresponding to the saturated samples with the correction parameter. In some embodiments, the correction parameter, e.g., gain G, may be multiplied to the intensities of the samples in the reference signal corresponding to the saturated samples in the reference signal, and the resulted values may replace the values of the saturated samples, according to Equation (5). For example, saturated samples 313-318 (as shown in FIG. 3A) can be restored as restored samples 323-328.

Method 500 may return to step S502 to continuously receive additional signals, and repeat steps S502-518 to correct the LiDAR return signal. In some embodiments, method 500 may be performed to correct the LiDAR return signal in real-time as the signal is received. Real-time signal correction may help LiDAR system 102 to estimate the intensity of the object in real-time, e.g., to assist an autonomous vehicle to make real-time driving decisions.

The disclosed systems and methods can effectively improve the intensity estimation accuracy when saturation occurs in the LiDAR return signal. For example, for an object with 0.8 reflectivity at 15 meters, its intensity estimation has an error of about 68% less than the ground truth. Applying the disclosed signal correction, its intensity estimation accuracy improved significantly to only have a 3.45% error bias from the ground truth. Moreover, smaller fluctuation of the enhanced intensity estimation, e.g., roughly 7%, is also achieved.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for correcting a Light Detection And Ranging (LiDAR) return signal, the system comprising:
   a communication interface configured to receive the LiDAR return signal and a reference signal, wherein:
      the LiDAR return signal comprises at least one saturated sample and at least one non-saturated sample both sampled from a same saturated pulse signal, a portion of the saturated pulse signal being clipped flat due to saturation; and
      the reference signal comprises reference samples of a predefined pulse signal in a same shape of the LiDAR return signal when the LiDAR return signal is not saturated; and a processor coupled to the communication interface and configured to:
      identify the at least one saturated sample and the at least one non-saturated sample from the LiDAR return signal;
      determine a correction parameter based on the at least one non-saturated sample in the LiDAR return signal and at least one corresponding reference sample in the reference signal, wherein the at least one non-saturated sample and the at least one reference sample are located at a sample location relative to the saturated pulse signal and the predefined pulse signal, respectively; and
      correct the at least one saturated sample in the LiDAR return signal using the correction parameter.

2. The system of claim 1, wherein the processor is configured to compare intensities of samples in the LiDAR return signal with a predetermined intensity threshold to identify the at least one saturated sample.

3. The system of claim 2, wherein the predetermined intensity threshold is a maximum input voltage of a converter configured to digitize the LiDAR return signal.

4. The system of claim 1, wherein the processor is further configured to:
   determine a ratio between the at least one non-saturated sample and the at least one corresponding reference sample; and
   determine the correction parameter as a function of the ratio.

5. The system of claim 1, wherein:
   the LiDAR return signal comprises a plurality of non-saturated samples; and
   the processor is further configured to:
      determine a first aggregated intensity of the plurality of non-saturated samples;
      determine a second aggregated intensity of a plurality of reference samples in the reference signal corresponding to the plurality of non-saturated samples; and
      determine the correction parameter as a ratio between the first aggregated intensity and the second aggregated intensity.

6. The system of claim 1, wherein the processor is configured to:
   correct the at least one saturated sample in the LiDAR return signal by scaling at least one reference sample in the reference signal corresponding to the at least one saturated sample with the correction parameter and replacing the at least one saturated sample with the scaled at least one reference sample.

7. The system of claim 1, wherein the processor is configured to:
   correct the LiDAR return signal in real-time as the LiDAR return signal is received.

8. A method for correcting a Light Detection And Ranging (LiDAR) return signal, the method comprising:
  receiving, by a communication interface, the LiDAR return signal and a reference signal, wherein:
    the LiDAR return signal comprises at least one saturated sample and at least one non-saturated sample both sampled from a same saturated pulse signal, a portion of the saturated pulse signal being clipped flat due to saturation; and
    the reference signal comprises reference samples of a predefined pulse signal in a same shape of the LiDAR return signal when the LiDAR return signal is not saturated;
  identifying, by a processor, the at least one saturated sample and the at least one non-saturated sample from the LiDAR return signal;
  determining, by the processor, a correction parameter based on the at least one non-saturated sample in the LiDAR return signal and at least one corresponding reference sample in the reference signal, wherein the at least one non-saturated sample and the at least one reference sample are located at a sample location relative to the saturated pulse signal and the predefined pulse signal, respectively; and
  correcting, by the processor, the at least one saturated sample in the LiDAR return signal using the correction parameter.

9. The method of claim 8, wherein identifying the at least one saturated sample further comprises comparing intensities of samples in the LiDAR return signal with a predetermined intensity threshold.

10. The method of claim 8, wherein determining the correction parameter further comprises:
  determining a ratio between the at least one non-saturated sample and the at least one corresponding reference sample; and
  determining the correction parameter as a function of the ratio.

11. The method of claim 8, wherein:
  the LiDAR return signal comprises a plurality of non-saturated samples; and
  determining the correction parameter further comprises:
    determining a first aggregated intensity of the plurality of non-saturated samples;
    determining a second aggregated intensity of a plurality of reference samples in the reference signal corresponding to the plurality of non-saturated samples; and
    determining the correction parameter as a ratio between the first aggregated intensity and the second aggregated intensity.

12. The method of claim 8, wherein correcting the at least one saturated sample in the LiDAR return signal further comprises scaling at least one reference sample in the reference signal corresponding to the at least one saturated sample with the correction parameter and replacing the at least one saturated sample with the scaled at least one reference sample.

13. The method of claim 8, further comprising:
  correcting the LiDAR return signal in real-time as the LiDAR return signal is received.

14. A Light Detection And Ranging (LiDAR) system, comprising:
  a photodetector configured to detect a LiDAR return signal returned from an object;
  a converter configured to digitize the LiDAR return signal; and
  a communication interface configured to receive the digitized LiDAR return signal and a reference signal, wherein:
    the digitized LiDAR return signal comprises at least one saturated sample and at least one non-saturated sample both sampled from a same saturated pulse signal, a portion of the saturated pulse signal being clipped flat due to saturation; and
    the reference signal comprises reference samples of a predefined pulse signal in a same shape of the LiDAR return signal when the LiDAR return signal is not saturated; and a processor coupled to the communication interface and configured to:
    identify the at least one saturated sample and the at least one non-saturated sample from the digitized LiDAR return signal;
    determine a correction parameter based on the at least one non-saturated sample in the digitized LiDAR return signal and at least one corresponding reference sample in the reference signal, wherein the at least one non-saturated sample and the at least one reference sample are located at a sample location relative to the saturated pulse signal and the predefined pulse signal, respectively; and
    correct the at least one saturated sample in the LiDAR return signal using the correction parameter.

15. The LiDAR system of claim 14, wherein the photodetector is configured to detect the LiDAR return signal returned from the object located at a distance of 5 meters to 30 meters from the LiDAR system.

16. The LiDAR system of claim 14, wherein:
  the converter has a predetermined intensity threshold; and
  the processor is configured to compare intensities of samples in the digitized LiDAR return signal with the predetermined intensity threshold to identify the at least one saturated sample.

17. The LiDAR system of claim 14, wherein the processor is further configured to:
  determine a ratio between the at least one non-saturated sample and the at least one corresponding samples reference sample; and
  determine the correction parameter as a function of the ratio.

18. The LiDAR system of claim 14, wherein the processor is configured to:
  correct the at least one saturated sample by scaling at least one reference sample in the reference signal corresponding to the at least one saturated sample with the correction parameter and replacing the at least one saturated sample with the scaled at least one reference sample.

* * * * *